US006807578B2

(12) United States Patent
Satran et al.

(10) Patent No.: US 6,807,578 B2
(45) Date of Patent: Oct. 19, 2004

(54) NACK SUPPRESSION FOR MULTICAST PROTOCOLS IN MOSTLY ONE-WAY NETWORKS

(75) Inventors: Julian Satran, Atlit (IL); Gidon Gershinsky, Haifa (IL); Benny Rochwerger, Zichron Yaacov (IL)

(73) Assignee: International Business Machines corporation, Armonk, NY (US)

( * ) Notice: Subject to any disclaimer, the term of this patent is extended or adjusted under 35 U.S.C. 154(b) by 773 days.

(21) Appl. No.: 09/808,290

(22) Filed: Mar. 14, 2001

(65) Prior Publication Data

US 2002/0133615 A1 Sep. 19, 2002

(51) Int. Cl.[7] .............................................. G06F 13/00

(52) U.S. Cl. ........................ 709/235; 709/217; 370/352

(58) Field of Search ................................ 709/200, 201, 709/203, 217, 218, 219, 220, 224, 227, 231, 232, 234, 235, 236; 370/230–235

(56) References Cited

U.S. PATENT DOCUMENTS

| | | | |
|---|---|---|---|
| 5,727,002 A | | 3/1998 | Miller et al. ................... 371/32 |
| 5,864,554 A | * | 1/1999 | Rostoker et al. ......... 370/395.6 |
| 5,923,662 A | * | 7/1999 | Stirling et al. ............... 370/432 |
| 6,134,599 A | * | 10/2000 | Chiu et al. ................... 709/252 |
| 6,151,696 A | * | 11/2000 | Miller et al. ................. 714/748 |
| 6,247,057 B1 | * | 6/2001 | Barrera, III ................. 709/229 |
| 6,269,085 B1 | * | 7/2001 | Provino et al. ............. 370/256 |
| 6,289,054 B1 | * | 9/2001 | Rhee ...................... 375/240.27 |
| 6,343,067 B1 | * | 1/2002 | Drottar et al. ............... 370/231 |
| 6,389,016 B1 | * | 5/2002 | Sabaa et al. ................. 370/389 |
| 6,392,993 B1 | * | 5/2002 | Hamilton et al. ........... 370/230 |
| 6,625,773 B1 | * | 9/2003 | Boivie et al. ................ 714/749 |
| 6,639,935 B2 | * | 10/2003 | Gibbons et al. ............. 375/130 |
| 6,683,850 B1 | * | 1/2004 | Dunning et al. ............ 370/231 |

FOREIGN PATENT DOCUMENTS

| | | |
|---|---|---|
| EP | 0969622 | 1/2000 |
| WO | 00/64111 | 10/2000 |

OTHER PUBLICATIONS

Sally Floyd et al., "A Reliable Multicast Framework for Light–Weight Sessions and Application Level Framing", SIGCOMM '95, Cambridge, MA, Sep. 1, 1995, 23 pages.

Shiroshita, Teruji et al., *Reliable Multicast Transport Protocol (RMTP)*, Draft Document for 37th IETF, Last Updated: Feb. 7, 1997, 7 pages.

K. Miller et al., *Starburst Multicast File Transfer Protocol (MFTP) Specification*, Internet Draft, Apr. 1998, 55 pages. (work in progress).

D. Wessels, "Squid Frequently Asked Questions" and About Squid, This FAQ, and Other Squid Information: (http://www.squid–cache.org/DOC/FAQ/FAQand(FAQ–1).html, 17 pages.

(List continued on next page.)

*Primary Examiner*—Moustafa M. Meky
(74) *Attorney, Agent, or Firm*—Darby & Darby

(57) ABSTRACT

In a multicasting system content is multicast from a sender to a plurality of receivers over a data network. Each receiver independently determines whether it is missing elements or packets of the content. Receivers having missing content each initiate a random timer. The receiver having the shortest random interval unicasts a negative acknowledgement to the sender, which immediately multicasts the negative acknowledgement to the other receivers. All other receivers having the same missing packet thereupon suppress their own negative acknowledgements as to that packet. A repair transmission is then multicast by the sender to all receivers. The random intervals have upper and lower bounds according to the round trip transmission time and the size of the largest missing data element.

20 Claims, 2 Drawing Sheets

OTHER PUBLICATIONS

M. Baentsch et al., "World Wide Web Caching: The Application-Level View of the Internet", IEEE Communications Magazine, Jun. 1997, pp. 170–178.

N. Smith, The UK National Web Cache—The State of the Art:, Computer Networks and ISDN Systems 28, 1996; pp. 1407–1414.

R. Fielding et al., *RFC 2068: Hypernet Transfer Protocol, HTTP/1.1*, Jan. 1997, 162 pages.

D. Cromer, *Internetworking with TCP/IP —vol. 1: Principles, Protocols, and Architecture, Chapter 17, $3^{rd}$Edition*, Prentice Hall, N.J., 1999, pp. 291–298.

U.S. patent application Ser. No. 09/138,994, entitled Multicast Data Transmission Over a One–Way Broadband Channel, filed Aug. 24, 1998.

J. Nonnenmacher, et al., "Scalable Feedback for Large Groups", IEEE/ACM Transactions of Networking, vol. 7, No. 3, Jun. 1999, pp. 375–386.

C. Liang, et al., "Feedback control using representatives and timer in reliable multicast protocols", Proceedings of IEEE Tencon 2000, Sep. 2000, vol. 1 of 3, pp. 338–340.

* cited by examiner

NACK SUPPRESSION FOR MULTICAST PROTOCOLS IN MOSTLY ONE-WAY NETWORKS

BACKGROUND OF THE INVENTION

1. Field of the Invention

This invention relates to multicast transmission of information across a data network. More particularly this invention relates to a technique for suppressing requests for retransmission of missing information by recipients at a downstream link of a mostly one-way data network.

2. Description of the Related Art

The push model for distributing data over the Internet and other client server networks has become more widespread in recent years. In modern versions of this model a server "multicasts" data to an interested subset of clients on the network, known as a "multicast group". Whoever is interested becomes a listener by joining the group.

By their nature, push applications are closer to the broadcasting paradigm of radio and television than to the interactive paradigm of the World Wide Web. As such, broadband networks, such as cable TV or satellite, can be used as a very efficient medium for the transmission of "pushed data". Unfortunately, currently these networks are one-way only. That is to say, data such as a television program is sent from a broadcasting facility (the head-end) to several receivers (end-users) without any feedback. As such, these networks are inappropriate for popular interactive push applications since the latter require a return channel. Although attempts to upgrade the current public network infrastructure are underway in several places around the world, it will take some years until reliable two-way broadband networks are commonplace and therefore, a mechanism for multicasting over one-way broadband networks is desirable.

In conventional unicast transmission, there are well known handshaking protocols that insure that blocks of data have been correctly received by the downstream recipient. The sender is easily able to determine whether a block of data requires retransmission, and can maintain awareness of the state of the recipient with little computational overhead. Without modifications, the unicasting techniques become unwieldy when applied to multicast transmission. Large numbers of recipients asynchronously requesting retransmissions are likely to produce congestion of the data network and degrade its performance. Furthermore, in the case of hierarchical multicasting arrangements, the algorithms based on estimating the paths to the recipient do not generalize well to tree structures, and the model of the communication as a conversation between sender and recipient does not stand up well.

Various techniques have been attempted to minimize requests for retransmission, such as the formation of token rings, and the use of a central controller. However these techniques have had limited success due to problems of scalability, and the need to secure group-wide agreement. The latter approach is difficult in the case of groups having transient membership.

In the document, *A Reliable Multicast Framework for Light-weight Sessions and Application Level Framing*, Sally Floyd et al., SIGCOMM '95, Cambridge Mass. (1 Sep. 1995), it is proposed to employ a model known as Application Level Framing. This is a decentralized approach, in which all traffic is multicast. Each session has a bandwidth limit, below which group members send multicast reports advising of their current state. Receivers learn of missing data either by examination of their received sequences, or by evaluation of a multicast report from another group member. Repair requests are multicast among the group. When a node is in receipt of a request or reply concerning a data element which it lacks, it suppresses its own request for repair. After receiving content from the server 10, the receivers 12, 14, 16 may transmit acknowledgements or negative acknowledgements reflecting their current state. The reports are limited such that they do not exceed more than a predetermined percentage of the network's bandwidth, in order to prevent network congestion. Nevertheless, there is necessarily some degradation of network performance.

The document, *Reliable Multicast Transport Protocol*, Shioshita, Teruji et al., Draft Document for the 37$^{th}$ IETF, Feb. 7, 1997, proposes a transport control mechanism to enable reliable multicast data transfer to a large number of receivers on a TCP/IP network from a server in parallel. This protocol promotes short delivery time, as the data is transferred only once, and conserves bandwidth because only one copy of the data is sent to the server. It has the advantage of requiring only a single session regardless of the number of receivers. However, despite some optimizations, there remains a requirement for receiver confirmation by ACK/NAK responses and the retransmission of data to selected receivers based on the information associated with the NAK response are disadvantages, as large numbers of receivers issuing ACK/NAK responses can still cause network congestion.

Another known multicast transport protocol is proposed in *Starburst Multicast File Transfer Protocol (MFTP) Specification*. Miller, K. et al., Internet Draft, April 1998. This protocol operates in the Application Layer.

In copending U.S. application Ser. No. 09/138,994, filed Aug. 24, 1998, of common assignee herewith, and hereby incorporated by reference, a technique of IP multicasting over existing broadband networks without using a return link is disclosed. This technique allows the issues of multicast group membership and error detection and recovery to be handled locally within an end-user terminal, without need for returning data to a host. According to the technique a single data transmitter sends a group of data items to a subset of possible receivers over a one-way channel. Each data item is divided into blocks which are encapsulated to form datagrams, each including a block sequence number, a data item identifier, and a timestamp indicating the age of the data item. A group directory is regularly sent by the transmitter to each of the possible receivers. The group directory contains information for all groups of data items, enabling each receiver to select the group of data item it wishes to receive. Reliability is provided by periodic retransmission of missing data. Despite these advantages, significant problems remain.

SUMMARY OF THE INVENTION

It is a primary advantage of some aspects of the present invention that missing elements in a multicast transmission can be supplied while processing a minimum number of repair requests from clients.

It is another advantage of some aspects of the invention that network congestion is minimized during multicasting.

It is yet another advantage of some aspects of the invention that network traffic is optimized during multicast transmission.

These and other advantages of the present invention are attained by a multicasting system suitable for use in data network caches, software distribution arrangements, and content provider applications in general. Content is multicast from a sender to a plurality of receivers over a data network, such as the Internet. Each receiver independently determines whether it is missing elements or packets of the content. Receivers having missing content each initiate a random timer. The receiver having the shortest random interval unicasts a negative acknowledgement to the sender. The sender immediately multicasts the negative acknowledgement to the other receivers. All other receivers having the same missing packet thereupon suppress their own negative acknowledgements as to that packet. A repair transmission is then multicast by the sender to all receivers. In some embodiments, the repair transmission could be multicast by a receiver possessing the missing packet. The random intervals have upper and lower bounds according to the round trip transmission time and the size of the largest missing data element.

The invention provides a method of transmitting data over a communications network, which includes multicasting content in a first multicast over a data network from a sender to a multicast group. The group comprises a plurality of receivers. Concurrently, in each of the receivers the method includes detecting a missing portion of the content, and delaying for a random interval. Thereafter no more than one negative acknowledgement is sent in a second transmission from one of the receivers to the sender. Thereafter, responsive to the negative acknowledgement the missing portion is multicast in a third multicast from the sender to the multicast group.

According to an additional aspect of the invention, the random interval has a lower limit given by $$LL=(a_1 t_{min}) \times b$$

wherein × is a multiplication operator, $a_1$ is a proportionality constant, $t_{min}$ is the minimal round trip transmission time between the sender and a respective one of the receivers, and b is a size of a largest packet of the missing portion.

According to an aspect of the invention, the random interval has an upper limit given by $$UL=(a_1 t_{min}) \times b$$

wherein × is a multiplication operator, $a_2$ is a proportionality constant, $t_{max}$ is the maximum round trip transmission time between the sender and a respective one of the receivers, and b is a size of a largest packet of the missing portion.

Another aspect of the invention includes determining a current quantity of traffic on the data network, wherein the second multicast is sent when the current quantity is less than a predetermined value.

According to a further aspect of the invention, the random interval is the shortest random interval of the receivers.

According to yet another aspect of the invention, the third multicast is sent by the sender.

According to still another aspect of the invention, the third multicast is sent by one of the receivers.

The invention provides a computer software product, comprising a computer-readable medium in which computer program instructions are stored, which instructions, when read by a computer, cause the computer to execute a method of transmitting data over a data network. The method includes multicasting content in a first multicast over the data network from a sender to a multicast group comprising a plurality of receivers. Concurrently, in each of the receivers the method includes detecting a missing portion of the content, and delaying for a random interval. Thereafter no more than one negative acknowledgement is transmitted to the sender. Thereafter, responsive to the negative acknowledgement, the sender repeats the negative acknowledgement to the receivers, others of which thereupon suppress their own negative acknowledgements. The missing portion is then multicast in a third multicast from either the sender or another of the receivers to the multicast group.

The invention provides a computer system, which includes a first computer, and a second computer interconnected in a data network with the first computer. The first computer and the second computer receive multicast content in a first multicast via the data network from a content server. The first computer and the second computer have program instructions stored therein, which instructions cause the first computer and the second computer to concurrently execute a method of transmitting data over the data network. The method includes detecting a missing portion of the content, determining random intervals, wherein the random interval of the first computer is shorter than the random interval of the second computer. The first and second computer delay for their respective random intervals. Thereafter the first computer sends a first negative acknowledgement to the content server. In the event that the second computer has not received the missing portion, the second computer suppresses a second negative acknowledgement therefor. The missing portion is contained in a third multicast from the content server.

According to an aspect of the invention, the third multicast is sent by the second computer.

BRIEF DESCRIPTION OF THE DRAWINGS

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Software programming code, which embodies the present invention, is typically stored in permanent storage of some type, such as a computer readable medium. In a client/server environment, such software programming code may be stored on the client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Figure 1:
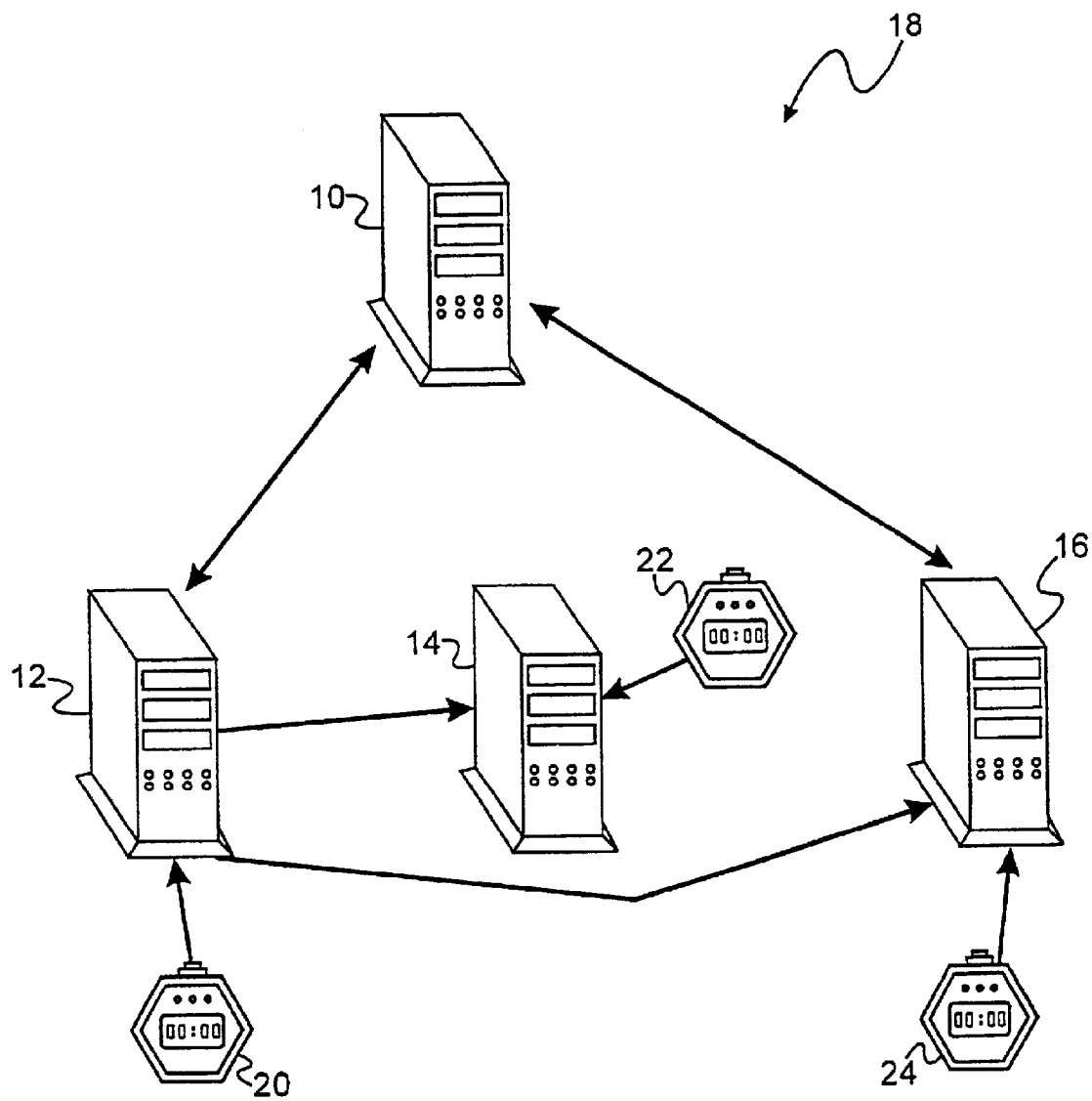
FIG. 1 is a schematic illustrating the interconnection of a computer system in a data network for use according to the present invention.

Turning now to the drawings, and to FIG. 1 thereof, there is shown a high level architectural diagram of a preferred embodiment of a multicasting system 18 which employs the techniques of the present invention. The source of the content to be distributed is a server 10, which is provided with transmitting capability, and also has receiving capability. In a hierarchical tree, the server 10 is a parent with respect to a plurality of downstream receivers 12, 14, 16. Content is multicast from the server 10 via a data network, which may be the Internet, to the receivers 12, 14, 16. The receivers 12, 14, 16 are generally provided with transmitting capability also, and are interconnected with one another and with the server 10. The receivers 12, 14, 16 are linked respectively to random timing circuits 20, 22, 24, which trigger transmissions by the receivers 12, 14, 16 in a manner disclosed hereinbelow.

The server 10 preferably employs the REMADE protocol to multicast the content. The REMADE protocol is disclosed in the above noted U.S. application Ser. No. 09/138,994. The REMADE protocol is a technique of IP multicasting over existing broadband networks without using a return link. This technique allows the issues of multicast group membership and error detection and recovery to be handled locally within an end-user terminal, without need for returning data to a host. According to the technique, a single data transmitter sends a group of data items to a subset of possible receivers. Each data item is divided into blocks, which are encapsulated to form datagrams, each including a block sequence number, a data item identifier, and a timestamp indicating the age of the data item. A catalog, comprising a group directory is regularly sent by the transmitter to each of the possible receivers. The group directory contains information for all groups of data items, enabling each receiver to select the group of data item it wishes to receive. Reliability may be enhanced by periodic retransmission of missing data.

In some embodiments, improvements in the REMADE protocol which were disclosed in our copending application Ser. No. 09/564,387, filed May 3, 2000, and herein incorporated by reference, may be used in the practice of the present invention.

Figure 2:
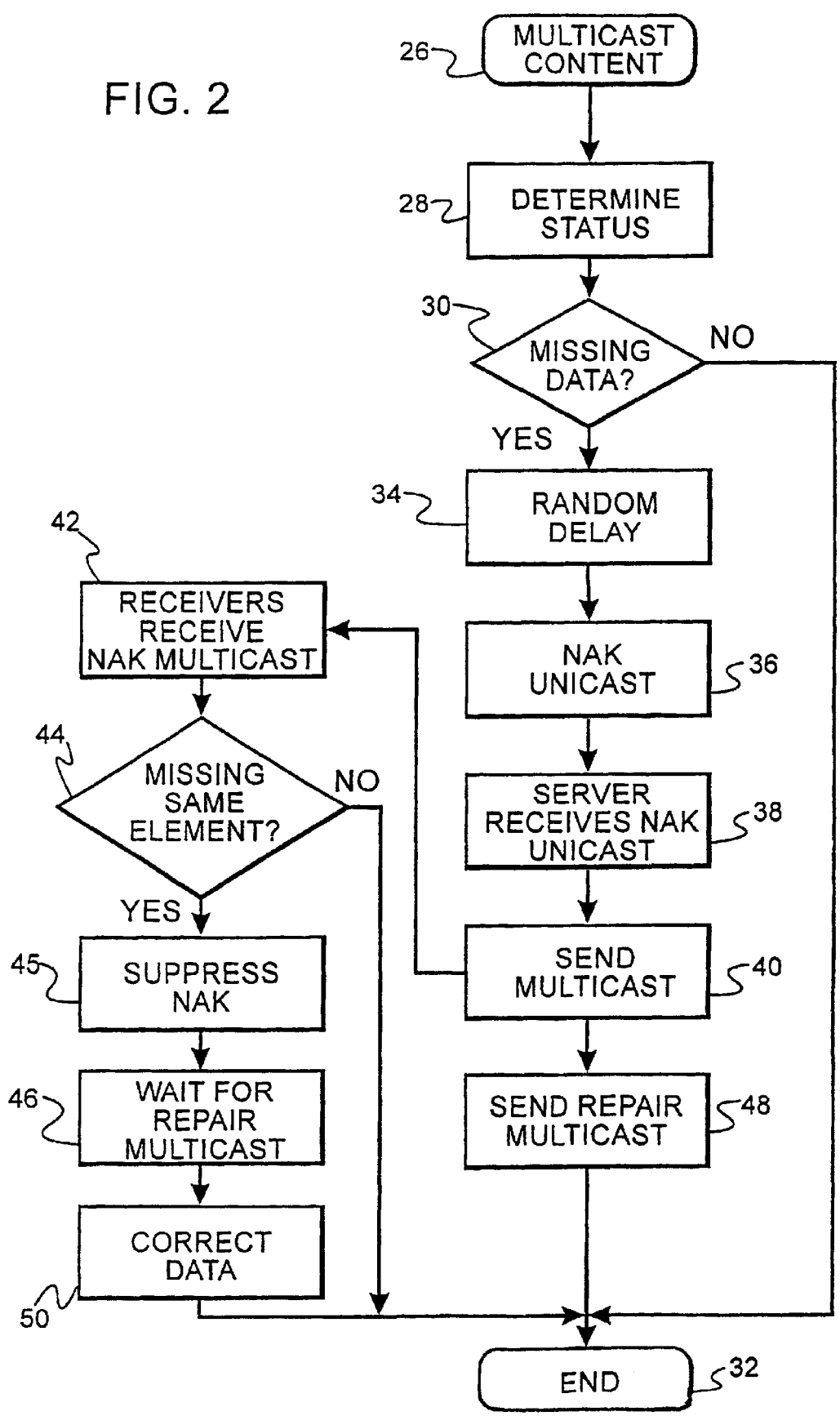
FIG. 2 is a flow chart of a method of transmitting data according to the invention.

The procedure for dealing with negative acknowledgements is now explained with reference to FIG. 1 and FIG. 2. In the configuration of the data network, the minimal and maximal round trip times between the server 10 and each of the receivers 12, 14, 16 is determined by known techniques. The multicast transmission occurs in blocks or packets, which may vary in size, according to the particular transmission protocol employed. However, the size of the blocks or packets is also known to the receivers 12, 14, 16.

At initial step 26 the server 10 multicasts content, for example a group directory, in accordance with the REMADE protocol. After receiving content from the server 10 at step 28, the receivers 12, 14, 16 then evaluate the content to determine whether data is missing at decision step 30.

If at decision step 30 it is determined that no data is missing, then no action is required, and control proceeds to termination step 32.

If at decision step 30 it is determined that data is missing, for example in the receiver 12, then at step 34 the random timing circuit 20 is initiated. A delay occurs for a random interval, until a signal is received by the receiver 12 from the random timing circuit 20. The random interval has a lower limit given by $$LL = (a_1 t_{min}) \times b \qquad (1)$$

wherein "×" is the multiplication operator. The factor $a_1$ is a proportionality constant. The value $t_{min}$ is the minimal round trip transmission time between the server 10 and the receiver 12. The value $a_1$ may be adjusted for a particular application, or in some embodiments can be varied according to prevailing conditions on the data network. The quantity b is the size of the largest missing data element.

The random interval has an upper bound given by $$UL = (a_2 t_{max}) \times b \qquad (2)$$

wherein "×" is the multiplication operator. The factor $a_2$ is a proportionality constant. The value $t_{max}$ is the maximum round trip transmission time between the server 10 and the receiver 12. The value $a_2$ may be adjusted for a particular application, or in some embodiments can be varied according to prevailing conditions on the data network. The quantity b is the size of the largest missing data element.

When a signal is received from the random timing circuit 20, the receiver 12 transmits a negative acknowledgement reflecting its current state at step 36 to the sender. In some embodiments, the transmission of step 36 could be multicast to the other receivers as well. This transmission is inhibited, however, if it would cause network traffic to exceed more than a predetermined percentage of the network's bandwidth. This limitation is desirable in order to minimize network congestion. It is understood that decision steps 30 and step 34 are also occurring simultaneously in the receivers 14, 16, but that the random timing circuit 20 was the first of the random timing circuits 20, 22, 24 to trigger.

When the receiver 12 transmits its current state, the report is received by the server 10 at step 38. At step 40, the server repeats the negative acknowledgement to the other receivers in a multicast report. At step 42 the report is received by the receivers 14, 16, as indicated by the arrows in FIG. 1.

At decision step 44 the receivers 14, 16 independently evaluate whether they are missing the same information as was reported missing by the receiver 12 in step 36. If the result of this test is affirmative, then, at step 46, any of the receivers 14, 16 missing the information simply wait until a repeat transmission is sent by the server 10. As shown at step 45, they do not multicast or otherwise transmit their own negative acknowledgement as to the information which was reported as missing by the receiver 12.

It the result of the test at decision step 44 is negative, then the receivers 14, 16 simply resume awaiting the random timing circuits 22, 24 to trigger, and control proceeds to termination step 32.

In response to reception of the multicast of the receiver 12 at step 38, and following completion of step 40, a repair transmission is multicast at step 48. The repair transmission is effected in some embodiments by the server 10. In other embodiments one of the receivers 14, 16 may respond, according to a particular control policy. A control policy, for example, could require the first unit receiving the negative acknowledgement from the receiver 12 to produce a repair transmission if possible.

The repair transmission is detected by the receivers 12, 14, 16. All further repair transmissions are then suppressed. Those receivers, which are missing the data element contained in the repair transmission, accept it, and make appropriate internal corrections to their files at step 50. Control then proceeds to termination step 32.

In the foregoing description it could be the case that all three of the receivers 12, 14, 16 were missing a particular data element. Yet, only one negative acknowledgement was placed on the data network. Up to two messages were suppressed, with corresponding benefit to the load on the data network.

It should be noted that while the system 18 is represented for clarity in FIG. 1 as a two-level tree, comprising the server 10 and the receivers 12, 14, 16, there can be any number of levels arranged in a more complex tree-structured hierarchy, as appropriate for a particular application. In such case the receivers 12, 14, 16 communicate with a lower level of receivers, which may be part of the same or a different multicast group. The improvement in performance of the data network linking all the receivers is scalable, and the advantage of the disclosed arrangement as compared with the conventional multicasting systems becomes greater as the number of receivers increases.

While this invention has been explained with reference to the structure disclosed herein, it is not confined to the details set forth, and this application is intended to cover any modifications and changes as may come within the scope of the following claims:

What is claimed is:

1. A method of transmitting data over a communications network, comprising the steps of:
   multicasting content in a first transmission over a data network from a sender to a multicast group comprising a plurality of receivers;
   in each of said receivers concurrently performing the steps of:
   detecting a missing portion of said content; and
   responsive to said step of detecting, delaying for a random interval;
   thereafter transmitting no more than one negative acknowledgement in a second transmission from one of said receivers to said sender; and
   responsive to said negative acknowledgement multicasting said missing portion in a third transmission from one of said sender and another of said receivers to said multicast group.

2. The method according to claim 1, wherein said random interval has a lower limit given by $$LL = (a_1 t_{min}) \times b$$

wherein × is a multiplication operator, $a_1$ is a proportionality constant, $t_{min}$ is a minimal round trip transmission time between said sender and a respective one of said receivers, and b is a size of a largest packet of said missing portion.

3. The method according to claim 1, wherein said random interval has an upper limit given by $$UL = (a_1 t_{min}) \times b$$

wherein × is a multiplication operator, $a_2$ is a proportionality constant, $t_{max}$ is a maximum round trip transmission time between said sender and a respective one of said receivers, and b is a size of a largest packet of said missing portion.

4. The method according to claim 1, further comprising the step of
   determining a current quantity of traffic on said data network;
   wherein said second transmission is sent when said current quantity is less than a predetermined value.

5. The method according to claim 1, wherein said random interval is a shortest said random interval of said receivers.

6. The method according to claim 1, wherein said third transmission is sent by said sender.

7. The method according to claim 1, wherein said third transmission is sent by one of said receivers.

8. A computer software product, comprising a computer-readable medium in which computer program instructions are stored, which instructions, when read by at least one computer, cause said at least one computer to execute a method of transmitting data over a data network, comprising the steps of:
   multicasting content in a first transmission over said data network from a sender to a multicast group comprising a plurality of receivers;
   in each of said receivers concurrently performing the steps of:
   detecting a missing portion of said content;
   determining a random interval; and
   responsive to said step of detecting, delaying for said random interval;
   thereafter transmitting no more than one negative acknowledgement in a second transmission from one of said receivers to said sender; and
   responsive to said negative acknowledgement multicasting said missing portion in a third transmission from one of said sender and another of said receivers to said multicast group.

9. The computer software product according to claim 8, wherein said random interval has a lower limit given by $$LL = (a_1 t_{min}) \times b$$

wherein × is a multiplication operator, $a_1$ is a proportionality constant, $t_{min}$ is a minimal round trip transmission time between said sender and a respective one of said receivers, and b is a size of a largest packet of said missing portion.

10. The computer software product according to claim 8, wherein said random interval has an upper limit given by $$UL = (a_1 t_{min}) \times b$$

wherein × is a multiplication operator, $a_2$ is a proportionality constant, $t_{max}$ is a maximum round trip transmission time between said sender and a respective one of said receivers, and b is a size of a largest packet of said missing portion.

11. The computer software product according to claim 8, further comprising the step of
   determining a current quantity of traffic on said data network;
   wherein said second transmission is sent when said current quantity is less than a predetermined value.

12. The computer software product according to claim 8, wherein said random interval is a shortest said random interval of said receivers.

13. The computer software product according to claim 8, wherein said third transmission is sent by said sender.

14. The computer software product according to claim 8, wherein said third transmission is sent by one of said receivers.

15. A computer system, comprising:
   a first computer;
   a second computer interconnected in a data network with said first computer, said first computer and said second computer receiving multicast content in a first transmission via said data network from a content server;
   wherein said first computer and said second computer have program instructions stored therein, which instructions cause said first computer and said second computer to concurrently execute a method of transmitting data over a communications network, comprising the steps of:

detecting a missing portion of said content;

determining random intervals, wherein a first random interval of said first computer is shorter than a second random interval of said second computer; and responsive to said step of detecting, said first computer delaying for said first random interval, and said second computer delaying for said second random interval; and thereafter said first computer transmitting a first negative acknowledgement in a second transmission to said content server;

said content server resending said first negative acknowledgement to said second computer, wherein in an event that said second computer has not received said missing portion, said second computer suppresses a second negative acknowledgement therefor; and receiving said missing portion in a third transmission from said content server.

16. The computer system according to claim 15, wherein said random intervals each have a lower limit given by $$LL = (a_1 t_{min}) \times b$$

wherein × is a multiplication operator, $a_1$ is a proportionality constant, $t_{min}$ is a minimal round trip transmission time between said content server and a respective one of said first computer and said second computer, and b is a size of a largest packet of said missing portion.

17. The computer system according to claim 15, wherein said random intervals each have an upper limit given by $$UL = (a_1 t_{min}) \times b$$

wherein × is a multiplication operator, $a_2$ is a proportionality constant, $t_{max}$ is a maximum round trip transmission time between said content server and a respective one of said first computer and said second computer, and b is a size of a largest packet of said missing portion.

18. The computer system according to claim 15, wherein said first computer further performs the step of determining a current quantity of traffic on said data network;

wherein said second transmission is sent when, said current quantity is less than a predetermined value.

19. The computer system according to claim 15, wherein said third transmission is sent by said content server.

20. The computer system according to claim 15, wherein said third transmission is sent by said second computer.

* * * * *

UNITED STATES PATENT AND TRADEMARK OFFICE
CERTIFICATE OF CORRECTION

PATENT NO. : 6,807,578 B2
DATED : October 19, 2004
INVENTOR(S) : Julian Satran et al.

It is certified that error appears in the above-identified patent and that said Letters Patent is hereby corrected as shown below:

Title page,
Item [73], Assignee, please delete "International Business Machines corporation" and substitute -- International Business Machines Corporation --.

Signed and Sealed this

First Day of March, 2005

JON W. DUDAS
*Director of the United States Patent and Trademark Office*